US012119216B2

(12) United States Patent
Yang et al.

(10) Patent No.: US 12,119,216 B2
(45) Date of Patent: Oct. 15, 2024

(54) ARC LAMP WITH FORMING GAS FOR THERMAL PROCESSING SYSTEMS

(71) Applicants: Beijing E-Town Semiconductor Technology Co., Ltd., Beijing (CN); Mattson Technology, Inc., Fremont, CA (US)

(72) Inventors: Michael X. Yang, Palo Alto, CA (US); Rolf Bremensdorfer, Bibertal (DE); Dave Camm, Vancouver (CA); Joseph Cibere, Burnaby (CA); Dieter Hezler, Lonsee-Halzhausen (DE); Shawming Ma, Sunnyvale, CA (US); Yun Yang, Berwyn, PA (US)

(73) Assignees: Beijing E-Town Semiconductor Technology Co., Ltd., Beijing (CN); Mattson Technology, Inc., Fremont, CA (US)

( * ) Notice: Subject to any disclaimer, the term of this patent is extended or adjusted under 35 U.S.C. 154(b) by 0 days.

(21) Appl. No.: 18/336,552

(22) Filed: Jun. 16, 2023

(65) Prior Publication Data

US 2023/0352294 A1 Nov. 2, 2023

Related U.S. Application Data

(63) Continuation of application No. 17/533,593, filed on Nov. 23, 2021, now Pat. No. 11,721,539.
(Continued)

(51) Int. Cl.
*H01J 61/073* (2006.01)
*H01J 61/28* (2006.01)
(Continued)

(52) U.S. Cl.
CPC .......... *H01J 61/86* (2013.01); *H01J 61/0732* (2013.01); *H01J 61/28* (2013.01); *H01J 61/526* (2013.01); *H05H 1/48* (2013.01)

(58) Field of Classification Search
CPC ........ H01J 61/86; H01J 61/0732; H01J 61/28; H01J 61/526; H01J 61/16; H01J 61/34;
(Continued)

(56) References Cited

U.S. PATENT DOCUMENTS 6,686,557 B1 2/2004 Chancey et al.
7,116,049 B2 10/2006 Machida
(Continued)

FOREIGN PATENT DOCUMENTS

CN 102549707 7/2012
CN 101896992 B 1/2013
(Continued)

OTHER PUBLICATIONS

Linde-gas.com. "Varigon H2 Increasing welding speeds and enhancing usability through the addition of hydrogen", https://www.linde-gas.com/en/products_and_supply/shielding_gases/varigon_h2.html, retrieved on Dec. 21, 2021, 3 pages.
(Continued)

*Primary Examiner* — Donald L Raleigh
(74) *Attorney, Agent, or Firm* — Dority & Manning, P.A.

(57) ABSTRACT

Apparatus, systems, and methods for processing workpieces are provided. An arc lamp can include a tube. The arc lamp can include one or more inlets configured to receive water to be circulated through the arc lamp during operation as a water wall, the water wall configured to cool the arc lamp. The arc lamp can include a plurality of electrodes configured to generate a plasma in a forming gas introduced into the arc lamp via the one or more inlets. The forming gas can be or can include a mixture of a hydrogen gas and an inert gas, the
(Continued)

hydrogen gas in the mixture having a concentration less than 4% by volume. The hydrogen gas can be introduced into the arc lamp prior to generating the plasma. The arc lamp may be used for processing workpieces.

24 Claims, 7 Drawing Sheets

Related U.S. Application Data

(60) Provisional application No. 63/117,597, filed on Nov. 24, 2020.

(51) Int. Cl.

| | |
|---|---|
| ***H01J 61/52*** | (2006.01) |
| ***H01J 61/86*** | (2006.01) |
| ***H05H 1/48*** | (2006.01) |

(58) Field of Classification Search
CPC .......... H01J 61/52; H01J 61/073; H01J 61/12; H05H 1/48; H01L 21/67115
See application file for complete search history.

(56) References Cited

U.S. PATENT DOCUMENTS

| | | | | |
|---|---|---|---|---|
| 8,216,773 | B1 | 7/2012 | Delgado | |
| 10,966,286 | B2 | 3/2021 | Bremensdorfer et al. | |
| 2002/0125224 | A1* | 9/2002 | Cook | B23K 20/129 219/121.36 |
| 2002/0136018 | A1* | 9/2002 | Yoo | H01J 61/12 362/491 |
| 2003/0032300 | A1 | 2/2003 | Waldfried et al. | |
| 2005/0179354 | A1 | 8/2005 | Camm et al. | |
| 2011/0042008 | A1 | 2/2011 | Hori | |
| 2014/0022782 | A1 | 1/2014 | Tessnow | |
| 2015/0108518 | A1 | 4/2015 | Samonji | |
| 2015/0145401 | A1* | 5/2015 | Gross | H01J 61/32 313/36 |
| 2016/0276140 | A1 | 9/2016 | Varadarajan et al. | |
| 2017/0194133 | A1* | 7/2017 | Lieberer | H05B 3/0047 |
| 2017/0196046 | A1 | 7/2017 | Bremensdorfer et al. | |
| 2018/0187331 | A1 | 7/2018 | List, III et al. | |
| 2020/0350158 | A1 | 11/2020 | Yang et al. | |
| 2022/0172951 | A1 | 6/2022 | Shigemasu | |

FOREIGN PATENT DOCUMENTS

| | | | |
|---|---|---|---|
| CN | 111952146 | A | 11/2020 |
| CN | 112188716 | A | 1/2021 |

OTHER PUBLICATIONS

International Search Report and Written Opinion for Application PCT/Us2021/059509, mailed Mar. 10, 2022, 9 pages.

* cited by examiner

ARC LAMP WITH FORMING GAS FOR THERMAL PROCESSING SYSTEMS

PRIORITY CLAIM

The present application is a continuation of U.S. application Ser. No. 17/533,593 having a filing date of Nov. 23, 2021, titled "Arc Lamp with Forming Gas for Thermal Processing Systems," which claims the benefit of priority of U.S. Provisional Application Ser. No. 63/117,597, filed on Nov. 24, 2020, titled "Arc Lamp with Forming Gas for Thermal Processing Systems," which is incorporated herein by reference.

FIELD

The present disclosure relates generally to thermal processing systems.

BACKGROUND

Millisecond anneal systems can be used for semiconductor processing for the ultra-fast heat treatment of substrates, such as silicon wafers. In semiconductor processing, fast heat treatment can be used as an anneal step to repair implant damage, improve the quality of deposited layers, improve the quality of layer interfaces, to activate dopants, and to achieve other purposes, while at the same time controlling the diffusion of dopant species. Millisecond, or ultra-fast, temperature treatment of semiconductor substrates can be achieved using an intense and brief exposure of light to heat the entire top surface of the substrate at rates that can exceed $10^{4}$° C. per second. The rapid heating of just one surface of the substrate can produce a large temperature gradient through the thickness of the substrate, while the bulk of the substrate maintains the temperature before the light exposure. The bulk of the substrate therefore acts as a heat sink resulting in fast cooling rates of the top surface.

SUMMARY

Aspects and advantages of embodiments of the present disclosure will be set forth in part in the following description, or may be learned from the description, or may be learned through practice of the embodiments.

One example aspect of the present disclosure is directed to an arc lamp. The arc lamp can include a tube. The arc lamp can include one or more inlets configured to receive water to be circulated through the arc lamp during operation as a water wall, the water wall configured to cool the arc lamp. The arc lamp can include a plurality of electrodes configured to generate a plasma in a forming gas introduced into the arc lamp via the one or more inlets. The forming gas can be or can include a mixture of a hydrogen gas and an inert gas, the hydrogen gas in the mixture having a concentration less than 4% by volume. The hydrogen gas can be introduced into the arc lamp prior to generating the plasma.

Another example aspect of the present disclosure is directed to a thermal processing system. The thermal processing system can include a processing chamber configured to thermally treat a workpiece and an arc lamp heat source. The arc lamp heat source can include a plurality of electrodes configured to generate a plasma in a forming gas. The forming gas can be or can include a mixture of a hydrogen gas and an inert gas with the hydrogen gas in the mixture having a concentration less than 4% by volume, the hydrogen gas introduced into the arc lamp prior to generating the plasma.

Another example aspect of the present disclosure is directed to an arc lamp. The arc lamp can include a tube. The arc lamp can include one or more inlets configured to receive water to be circulated through the arc lamp during operation as a water wall, the water wall configured to cool the arc lamp. The arc lamp can include a plurality of electrodes configured to generate a plasma in a forming gas introduced into the arc lamp via the one or more inlets, the forming gas introduced into the arc lamp prior to generating the plasma. The forming gas can include one or more inert gases. The plurality of electrodes can include a tip where the tip of at least one of the plurality of electrodes comprises hafnium alloy or tantalum hafnium carbide and a heat sink around the tip.

Variations and modification can be made to the example aspects of the present disclosure. Other example aspects of the present disclosure are directed to systems, methods, devices, and processes for thermally treating a semiconductor substrate.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
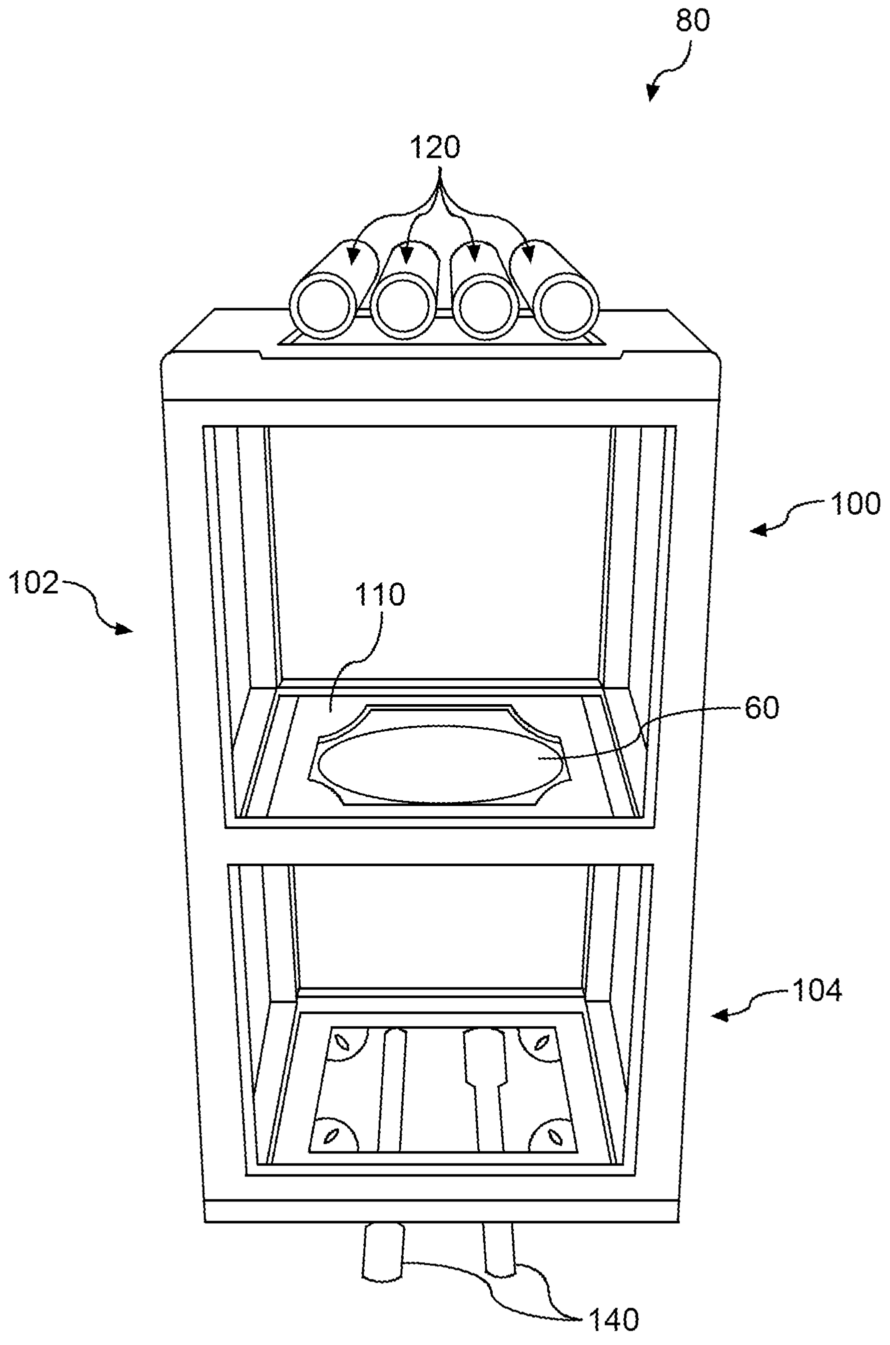
FIG. 1 depicts a perspective view of a portion of an example thermal processing system according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to thermal processing systems and to arc lamps used in thermal processing systems, such as a millisecond anneal thermal processing systems. The thermal processing systems can include one or more heat sources to provide an intense and brief exposure of light to heat a surface of a workpiece at heating rates that can exceed, for instance, about $10^{4}$° C./sec.

An arc lamp heat source can include a cathode electrode, an anode electrode, one or more inlets for injection of water and a gas, and a quartz tube. A voltage can be applied between the cathode electrode and the anode electrode. The gas can be converted into a high-pressure plasma during an arc discharge. The arc discharge can take place in the quartz tube between the negatively charged cathode electrode and the spaced apart positively charged anode electrode (e.g., spaced about 300 millimeters apart). When a voltage between the cathode electrode and the anode electrode reaches a breakdown voltage of the gas, a stable, low inductive plasma can be formed which emits light in the visible and ultraviolet range of the electromagnetic spectrum.

An arc lamp heat source can be coupled to a water loop configured to circulate water through the arc lamp heat source during operation of the arc lamp heat source. For instance, an arc lamp heat source can include one or more inlets configured to receive water to be circulated through the arc lamp heat source during operation as a water wall. The water wall can be configured to cool the arc lamp heat source during operation. A plasma generated in the arc lamp can cause free oxygen to dissociate from the water wall flowing through the arc lamp. The free oxygen can react with electrodes in the arc lamp (e.g., tungsten electrodes) to oxidize the electrodes, thereby reducing lamp life. Thus, it can be desirable that oxidation of the electrodes is reduced such that lamp life can be extended. Additionally, the generated plasma can produce high heat which can erode the electrodes. Improving the heat resistance of the electrodes can reduce erosion caused by the plasma and can extend lamp life.

According to example aspects of the present disclosure, the thermal processing system can include a processing chamber configured for thermal treatment of a workpiece, such as a semiconductor wafer. The thermal processing system can further include one or more arc lamp heat sources. The arc lamp heat source(s) can include a plurality of electrodes to generate a plasma from a gas. The gas can include a mixture of one or more inert gases—one or more of argon gas, helium gas, neon gas, or xenon gas—and a hydrogen gas. The hydrogen gas can be pure hydrogen gas ($H_2$) and/or can include a deuterium gas ($D_2$). In some embodiments, the gas can be a premixed forming gas. A concentration of the hydrogen gas in the mixture can be less than about 4% by volume, such as less than about 3% by volume, such as less than about 2% by volume, such as about 1% or less by volume. An example forming gas can be a Varigon $H_2$ gas from The Linde Group.

The hydrogen gas present in the forming gas during an arc discharge between the plurality of electrodes can react with free oxygen to reduce oxidation of the plurality of electrodes, thereby extending lamp life of the arc lamp heat source. In addition, low concentration of the hydrogen gas in the forming gas can allow operation of the arc lamp heat source at partial pressures below a safety/flammability limit for the hydrogen gas.

In some embodiments, the arc lamp heat source can be configured such that the forming gas can enter the arc lamp heat source at a first electrode of the plurality of electrodes, and the forming gas can be exhausted at a second electrode of the plurality of electrodes. For instance, the forming gas can enter into the quartz tube at high flow rates on a cathode end of the arc lamp heat source and can be exhausted at an anode end.

In some embodiments, the hydrogen gas (e.g., the forming gas) can be introduced prior to ignition of the arc lamp. For instance, the forming gas may be introduced at a time prior to a time at which the arc discharge between the plurality of electrodes is formed such that the hydrogen gas is sufficiently present at the plurality of electrodes to react with the free oxygen, thereby reducing oxidation of the plurality of electrodes. For instance, in some embodiments, the forming gas may be present at some or all of the plurality of electrodes prior to forming the arc discharge. For instance, the electrodes may thus be protected from oxidization from the free oxygen when energized to produce the arc discharge. In some cases, the hydrogen can additionally and/or alternatively reduce the formation of copper oxides.

In some embodiments, one or more inlets can inject water (e.g., high purity water) at high flow rates on a cathode end of the arc lamp heat source and exhausted at an anode end. The one or more inlets can inject water perpendicular to a center axis of the arc lamp heat source such that the centrifugal action generates a water vortex to form the water wall. Hence, along the center axis of the arc lamp heat source, a channel can be formed for the forming gas. The one or more inlets can be configured such that the forming gas rotates in the same direction as the water wall relative to the center axis of the arc lamp heat source during operation of the arc lamp heat source. Once a plasma has formed, the water wall can protect the quartz tube and confine the plasma to the center axis.

In some embodiments, the quartz tube can contain the plasma, the forming gas and the water wall. The water wall and the electrodes (e.g., cathode and anode) can be in direct contact with the plasma.

In some embodiments, the arc lamp heat source can further include a circulation system to circulate the forming gas and water in the arc lamp heat source. For instance, the circulation system can be a closed loop system for supplying the forming gas and the water to operate the arc lamp heat source. The forming gas and the water can be fed to the arc lamp heat source. For instance, the forming gas and the water can be introduced into the arc lamp via the one or more inlets on the cathode end of the arc lamp heat source. The forming gas and the water as a mixture can be exhausted on the anode end of the arc lamp heat source. The forming gas and/or the water may be fed to the arc lamp prior to ignition of the arc lamp. The mixture of the forming gas and the water can be separated into dry forming gas and gas free water by a separator before the forming gas and water can be re-fed into the arc lamp heat source. To generate a desired pressure-drop across the arc lamp heat source, the mixture of the forming gas and the water can be pumped by a water driven jet pump.

In some embodiments, a high-power electric pump can supply a water pressure to drive the water wall in the arc lamp heat source, the cooling water for the lamp electrodes, and the motive flow for the jet pump. The separator downstream to the jet pump can be used to extract the liquid and the gaseous phase of water from the mixture. Before the forming gas re-enters the arc lamp heat source, the forming gas can be further dried in a coalescing filter, and a flow rate of the forming gas can be controlled by a control valve and/or mass flow controller.

In some embodiments, the arc lamp heat source can further include a gas supply that can provide the forming gas to the circulation system. For instance, the forming gas can be premixed. The gas supply can provide the premixed forming gas to the circulation system. For instance, the gas supply can provide the forming gas and/or at least the hydrogen gas to the circulation system prior to generation of the plasma. In some embodiments, the gas supply can include one or more feed gas lines. Each feed gas line can be controlled using one or more control valves and/or mass flow controllers to deliver a desired amount of the forming gas into the arc lamp heat source. A control valve and/or mass flow controller can be used to control a flow rate of a feed gas line to flow the forming gas into the arc lamp heat source. In some embodiments, the gas supply can be part of the circulation system. In some embodiments, the circulation system and the gas supply system can be included in the arc lamp heat source.

In some cases, it can be beneficial for the plurality of electrodes to be resistant to the high heat created by the generated plasma to increase lamp life. Tungsten electrodes can be resistant to heat due to the high melting point of tungsten. According to example aspects of the present disclosure, one or more of the electrodes in the arc lamp (e.g., the anode electrode) can be formed at least in part using a hafnium alloy and/or tantalum hafnium carbide (e.g., as a tip of the electrode). Using a hafnium alloy (e.g., an alloy of hafnium, carbon, and nitrogen) or tantalum hafnium carbide can provide electrodes having an increased melting point relative to tungsten. In some embodiments, silver and diamond-copper sintering materials can be used as heat sink materials in one or more electrodes of the arc lamp to improve heat transfer of the electrodes.

Example aspects of the present disclosure provide a number of technical effects and benefits. For instance, using a hafnium alloy tip alongside a silver and diamond-copper sintering material heat sink in the plurality of electrodes can increase their resistance to the heat of the generated plasma. Furthermore, reduction in oxidation of the electrodes can be achieved when hydrogen gas of the forming gas reacts with free oxygen dissociated from the water wall. For instance, the hydrogen gas can be introduced prior to formation of the plasma to reduce oxidation of the electrodes. Both the increase in heat resistance and the reduction in oxidation can extend the lamp life of the arc lamp heat source. In addition, low concentration of the hydrogen gas in the forming gas can allow operation of the arc lamp heat source at partial pressures below a safety/flammability limit for the hydrogen gas.

Aspects of the present disclosure are discussed with reference to a "workpiece" or "wafer" or semiconductor wafer for purposes of illustration and discussion. Those of ordinary skill in the art, using the disclosures provided herein, will understand that the example aspects of the present disclosure can be used in association with any workpiece or other suitable substrate. In addition, the use of the term "about" or "approximately" in conjunction with a numerical value or other value is intended to refer to within ten percent (10%) of the stated numerical value.

Figure 2:
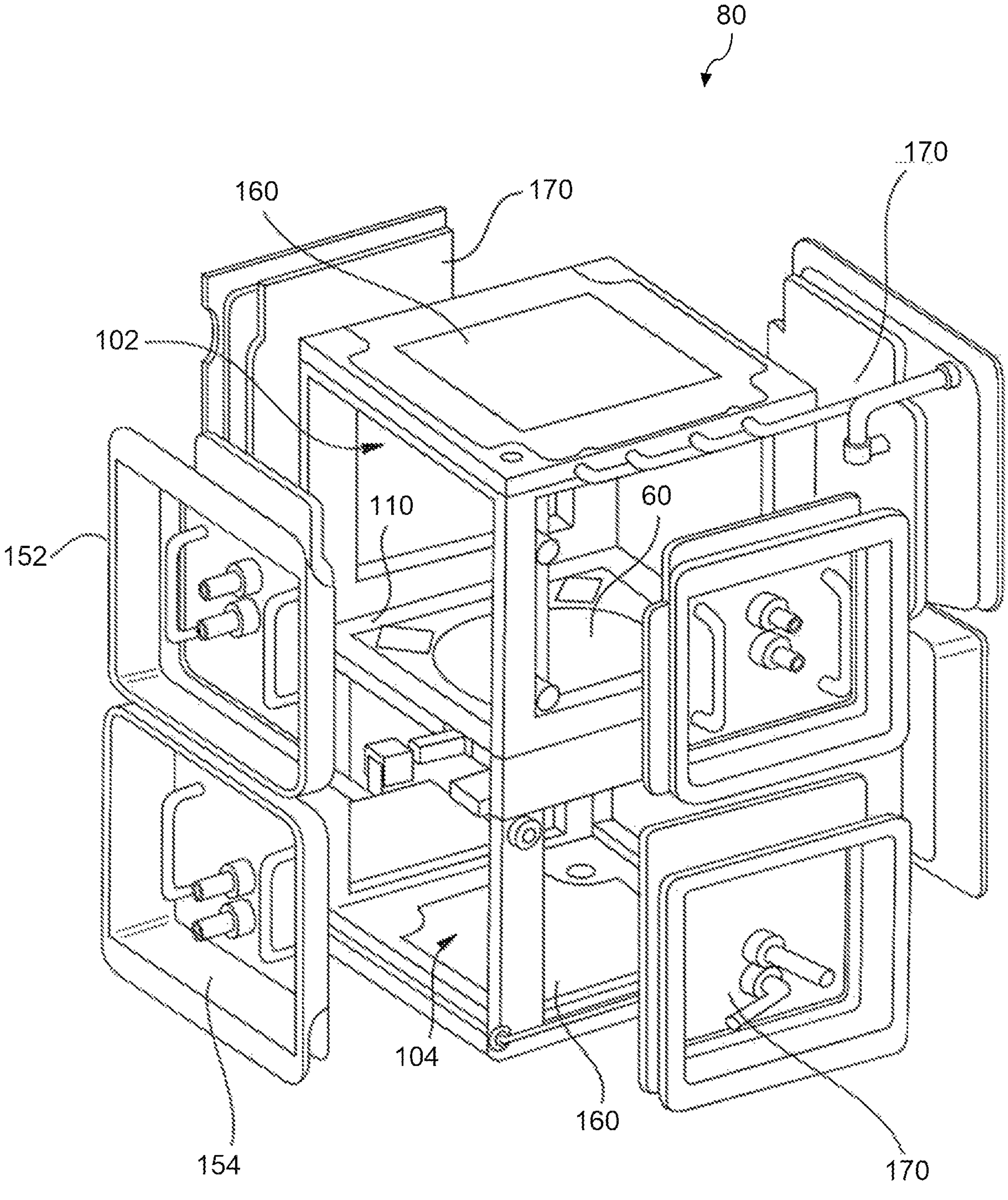
FIG. 2 depicts an exploded view of an example thermal processing system according to example embodiments of the present disclosure.
Figure 3:
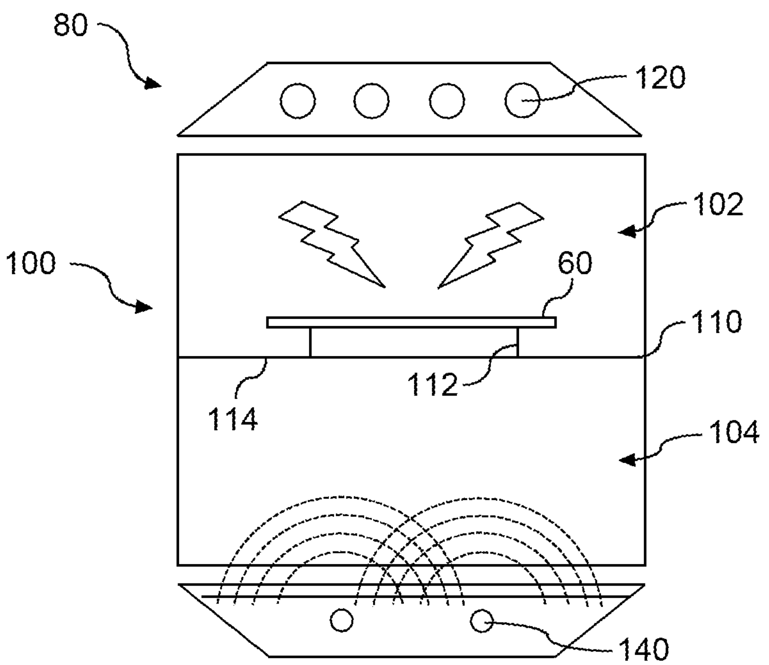
FIG. 3 depicts a cross-sectional view of an example thermal processing system according to example embodiments of the present disclosure.

With reference now to the FIGS., example embodiments of the present disclosure will now be discussed in detail. FIGS. 1 to 4 depict various aspects of an example thermal processing system 80 according to example embodiments of the present disclosure. As shown in FIGS. 1-3, a thermal processing system 80 can include a process chamber 100. The process chamber 100 can be divided by a wafer plane plate 110 into a top chamber 102 and a bottom chamber 104. A workpiece 60 can be supported by support pins 112 (e.g., quartz support pins) mounted to a wafer support plate 114 (e.g., quartz glass plate inserted into the wafer plane plate 110).

As shown in FIGS. 1 and 3, the thermal processing system 80 can include a plurality of arc lamps 120 (e.g., four arc lamps) arranged proximate the top chamber 102 as light sources for intense exposure (e.g., millisecond exposure time and/or less than a thermal conduction time for the workpiece) of the top surface of the workpiece 60—the so called "flash." The flash can be applied to the workpiece when the substrate has been heated to an intermediate temperature (e.g., about 450° C. to about 900° C.).

A plurality of continuous mode arc lamps 140 (e.g., two arc lamps) located proximate the bottom chamber 104 can be used to heat the workpiece 60 to the intermediate temperature. In some embodiments, the heating of the workpiece 60 to the intermediate temperature is accomplished from the bottom chamber 104 through the bottom surface of the workpiece at a ramp rate which heats the entire bulk of the workpiece 60.

As shown in FIG. 2, the light to heat the workpiece 60 from the bottom arc lamps 140 (e.g., for use in heating the workpiece to an intermediate temperature) and from the top arc lamps 120 (e.g., for use in providing millisecond heating by flash) can enter the processing chamber 100 through water windows 160 (e.g., water cooled quartz glass windows). In some embodiments, the water windows 160 can include a sandwich of two quartz glass panes between which an about a 4 mm thick layer of water is circulating to cool the quartz panes and to provide an optical filter for wavelengths, for instance, above about 1400 nm.

Figure 4:
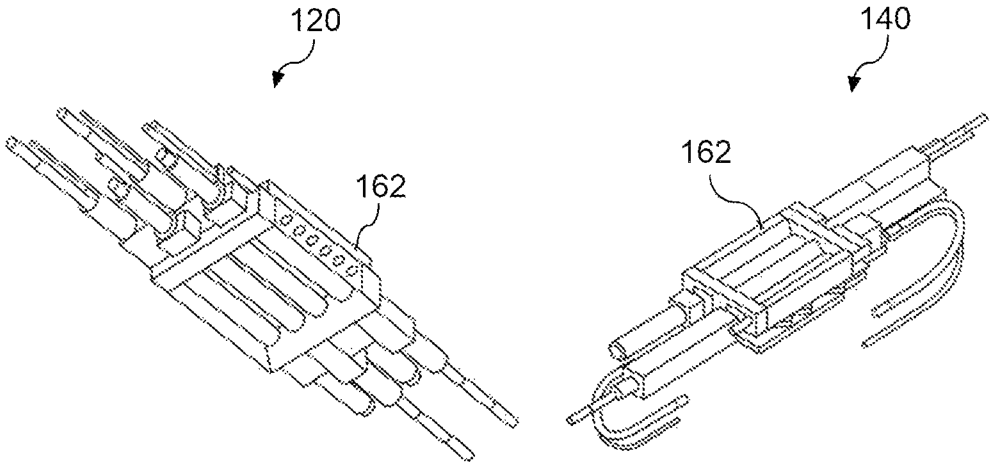
FIG. 4 depicts a perspective view of example lamps used in a thermal processing system according to example embodiments of the present disclosure.

As further illustrated in FIG. 2, process chamber walls 150 can include reflective mirrors 170 for reflecting the heating light. The reflective mirrors 170 can be, for instance, water cooled, polished aluminum panels. In some embodiments, the main body of the arc lamps used in the thermal processing system can include reflectors for lamp radiation. For instance, FIG. 4 depicts a perspective view of both a top arc lamp array 120 and a bottom arc lamp 140 that can be used in the thermal processing system 80. As shown, the main body of each arc lamp array 120 and 140 can include a reflector 162 for reflecting the heating light. These reflectors 162 can form a part of the reflecting surfaces of the process chamber 100 of the thermal processing system 80.

Figure 5:
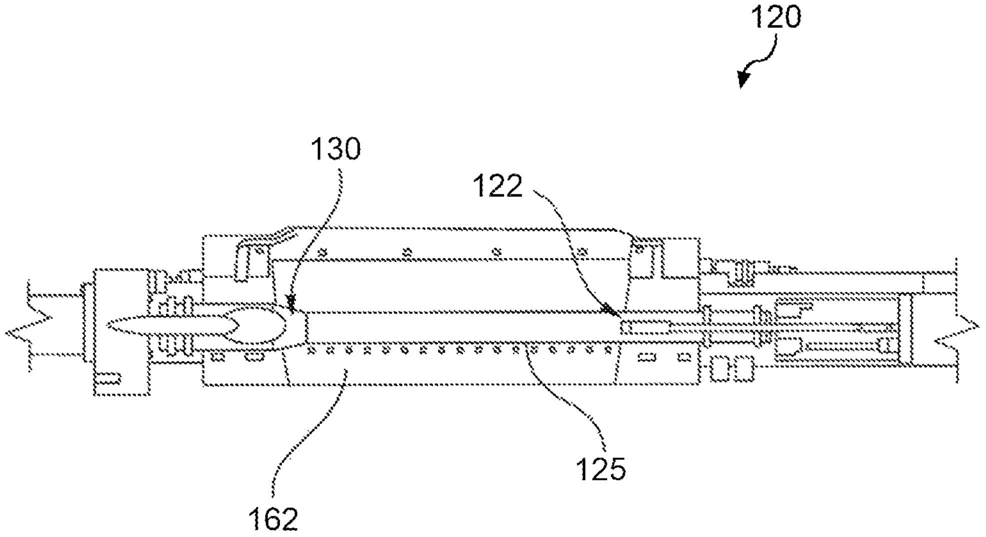
FIG. 5 depicts an example arc lamp in a thermal processing system according to example embodiments of the present disclosure.

FIGS. 5-9 depict aspects of example upper arc lamps 120 that can be used as light sources for intense exposure of the top surface of the workpiece 60 (e.g., the "flash") according to example aspects of the present disclosure. For instance, FIG. 5 depicts a cross-sectional view of an example arc lamp 120. The arc lamp 120 can be, for instance, an open flow arc lamp, where pressurized forming gas (e.g., a mixture of one or more inert gases and a hydrogen gas where a concentration of the hydrogen gas in the mixture is less than about 4% by volume) can be converted into a high-pressure plasma during an arc discharge. For instance, the forming gas can be introduced prior to generation of the plasma, such as prior to the arc discharge. The hydrogen gas in the forming gas can react with free oxygen in the arc lamp to reduce oxidation of the electrodes.

The arc discharge can take place in a quartz tube 125 between a negatively charged cathode 122 and a spaced apart positively charged anode 130 (e.g., spaced about 300 mm apart). As soon as the voltage between the cathode 122 and the anode 130 reaches a breakdown voltage of the forming gas, a stable, low inductive plasma is formed which emits light in the visible and UV range of the electromagnetic spectrum. As shown in FIG. 5, the arc lamp can include a reflector 162 that can be used to reflect light provided by the lamp for processing of the workpiece 60.

Figure 6:
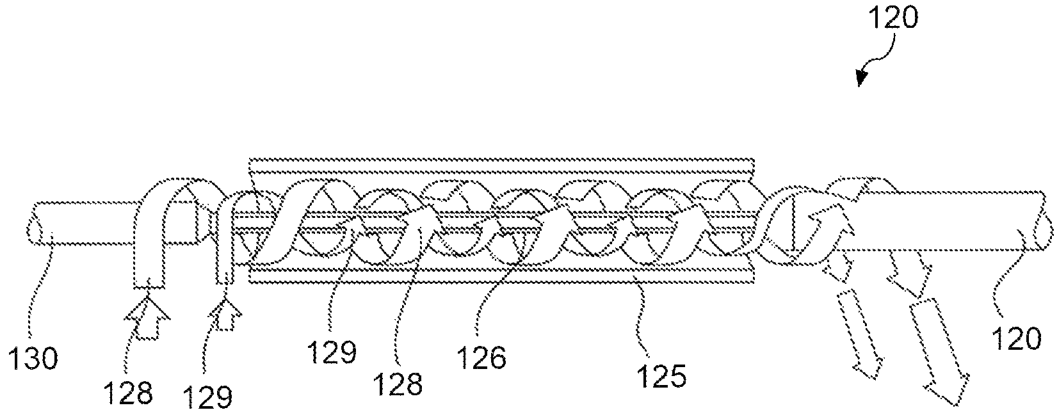
FIG. 6 depicts an example operation of an arc lamp in a thermal processing system according to example embodiments of the present disclosure.
Figure 7:
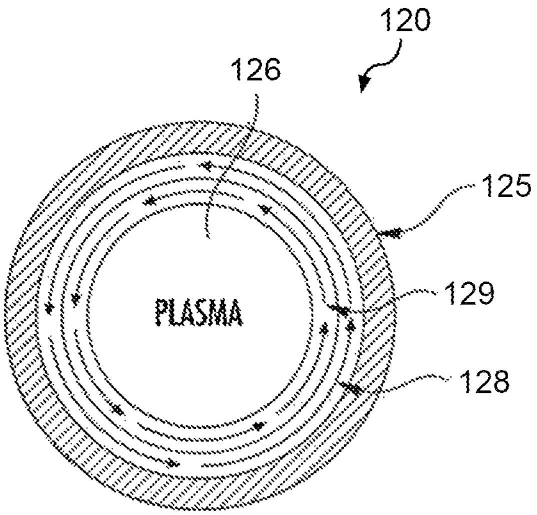
FIG. 7 depicts an example operation of an arc lamp in a thermal processing system according to example embodiments of the present disclosure.

FIGS. 6 and 7 depict aspects of example operation of an arc lamp 120 in thermal processing system 80 according to example embodiments of the present disclosure. More particularly, a plasma 126 is contained within a quartz tube 125 which is water cooled from the inside by a water wall 128. The water wall 128 is injected at high flow rates on the cathode end of the arc lamp 120 and exhausted at the anode end. The forming gas can enter the arc lamp 120 at the cathode end and exhausted from the anode end. The water forming the water wall 128 is injected perpendicular to the lamp axis such that the centrifugal action generates a water vortex. Hence, along the center line of the lamp, a channel is formed for the forming gas 129. The forming gas 129 is rotating in the same direction as the water wall 128. In some embodiments, the forming gas 129 and/or the water wall 128 can be injected prior to generation of plasma 126. Once a plasma 126 has formed, the water wall 128 is protecting the quartz tube 125 and confining the plasma 126 to the center axis. Only the water wall 128 and the electrodes (cathode 122 and anode 130) are in direct contact with the high energy plasma 126.

Figure 8:
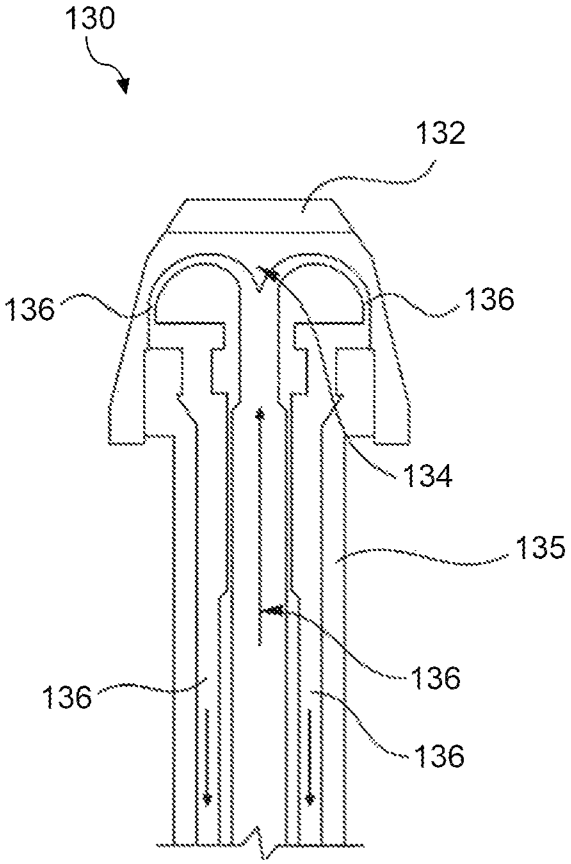
FIG. 8 depicts an example operation of an arc lamp in a thermal processing system according to example embodiments of the present disclosure.

FIG. 8 depicts a cross sectional view of an example electrode (e.g., anode 130) used in conjunction with an arc lamp according to example embodiments of the present disclosure. FIG. 8 depicts an example anode 130. However, a similar construction can be used for the cathode 122. In some embodiments, as the electrodes experience a high heat load, one or more of the electrodes can each include a tip 132. The tip can be made from tungsten. The tip can be coupled to and/or fused to a water-cooled copper heat sink 134. The water-cooled copper heat sink 134 can include at least a portion the internal cooling system of the electrodes, e.g., one or more water cooling channels 136. The electrodes can further include a brass base 135 with one or more water cooling channels 136 to provide for the circulation of water or other fluid and the cooling of the electrodes.

Figure 9:
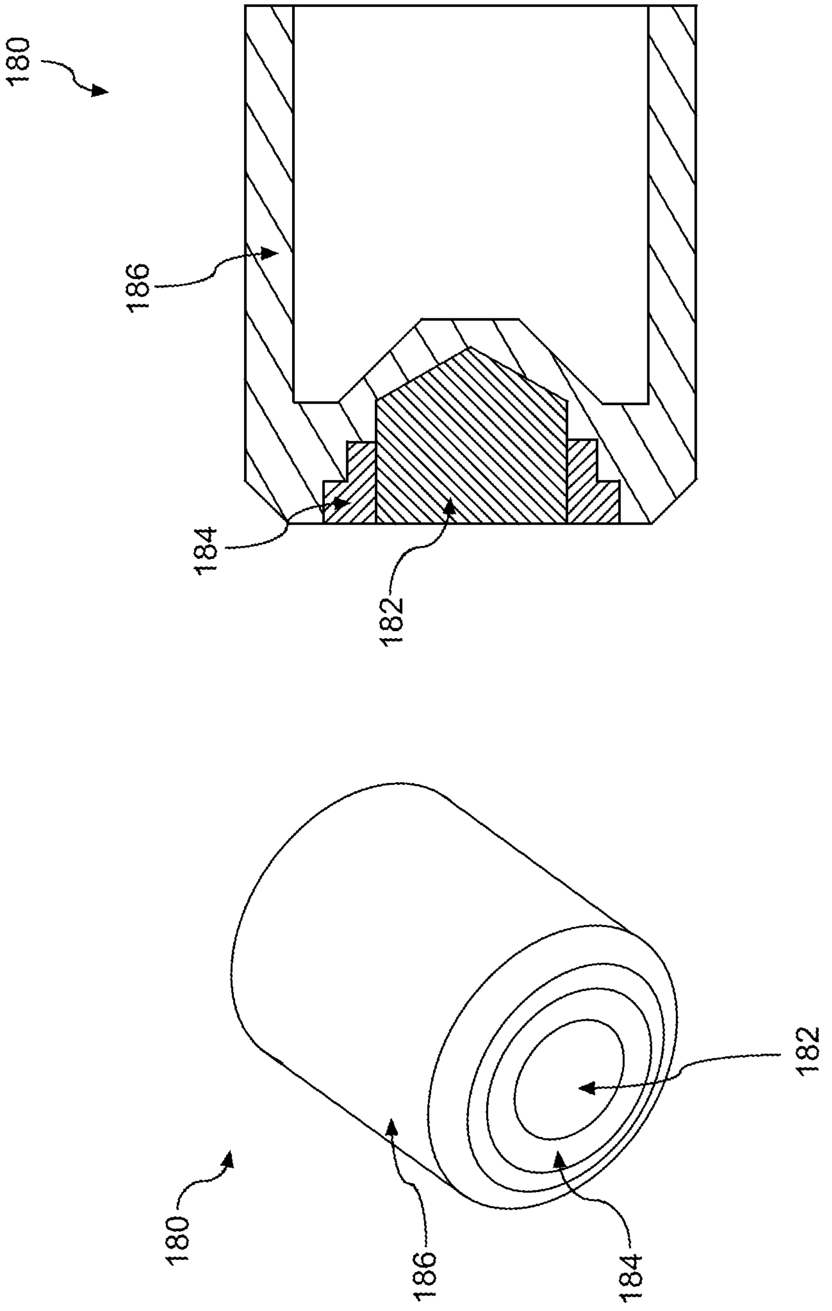
FIG. 9 depicts an example anode of an arc lamp according to example embodiments of the present disclosure.

FIG. 9 depicts another embodiment of the electrode 180 (e.g., an anode 130). The tip 182 of the electrode 180 can be made of hafnium alloy. The hafnium alloy can include hafnium, carbon, and nitrogen. In addition and/or in the alternative, the tip 182 of the electrode 180 can be made from hafnium carbide. Such metals can better withstand the high heat load relative to tungsten due to higher melting points.

In some embodiments, the electrode 180 can include a heat sink at least partially disposed around the tip 182. The heat sink can include an inner portion 184 and an outer portion 186. In some embodiments, the inner portion 184 and the outer portion 186 can be made from different materials. For instance, the inner portion 184 can be made of diamond-copper sintering material. The outer portion 186 can be made of silver. Diamond-copper sintering material and silver have higher thermal conductivity than copper and, therefore, can be suited to handle the role of a heat sink.

Variations and modifications can be made to this example embodiment. For instance, tantalum hafnium carbide can replace the hafnium alloy on the tip 182 of the electrode 180. With the heat sink, the outer portion 186 can be made of diamond-copper sintering material, and the inner portion 184 can be made of silver. Moreover, with an inner portion 184 of diamond-copper sintering material or silver, the outer portion 186 can be made of copper.

The advantages that can be found in the embodiment variations of the electrode can be more pronounced when applied to the anode rather than the cathode. The anode can often take on higher heat loads than the cathode from the generated plasma. The embodiment variations can result in an improvement in heat resistance. Therefore, the embodiment variations can find a greater use in extending lamp life when implemented in the anode.

Figure 10:
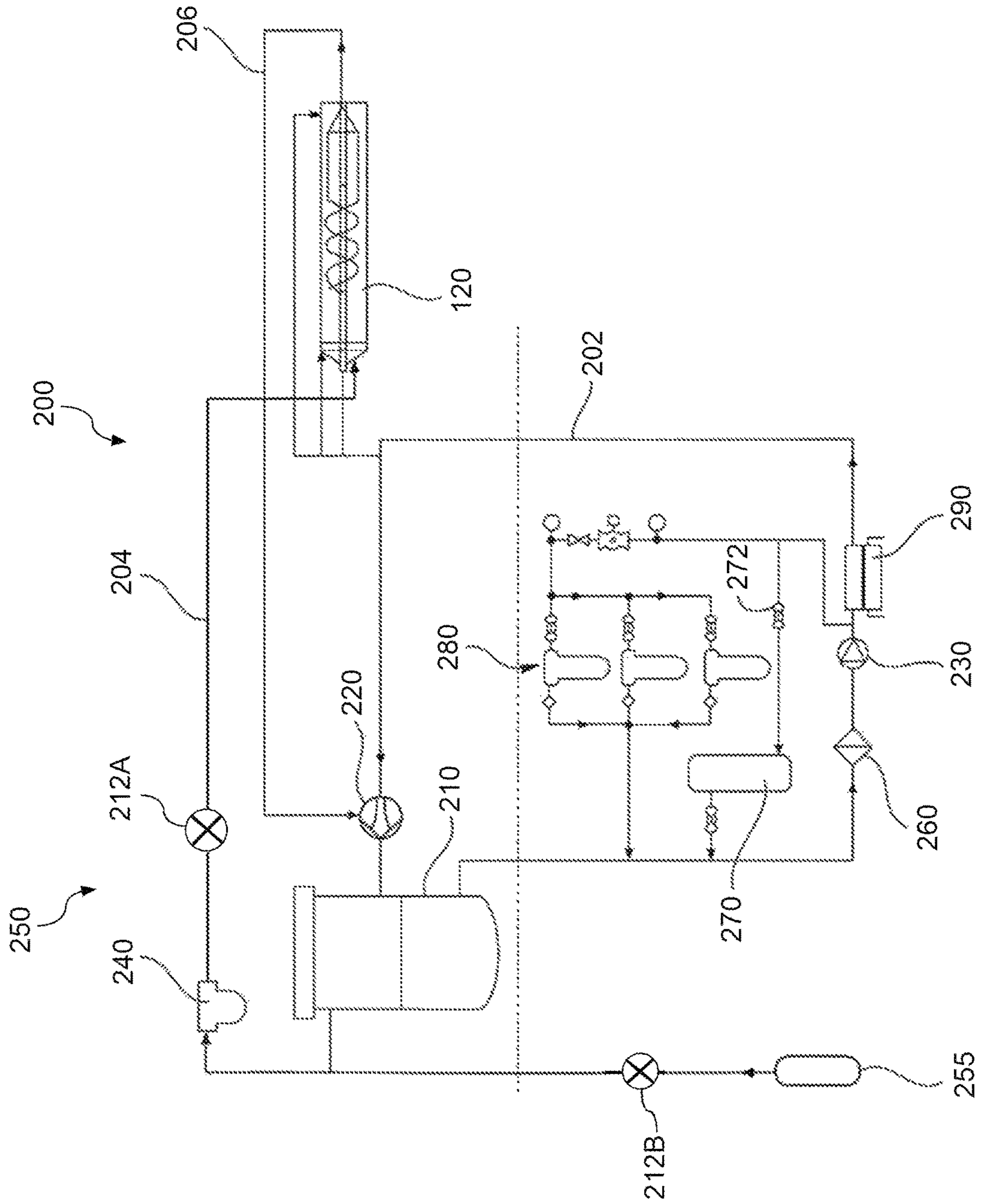
FIG. 10 depicts an example operation of an arc lamp in a thermal processing system according to example embodiments of the present disclosure.

The arc lamps used in example thermal processing systems according to aspects of the present disclosure can be an open flow system for water and forming gas. However, for conservation reasons, both media can be circulated in a close loop system in some embodiments. FIG. 10 depicts an example closed loop system 200 (also referred to as a circulation system) for supplying water and forming gas to operate the open flow arc lamps used in thermal processing systems according to example embodiments of the present disclosure.

More particularly, high purity water or gas free water 202 and forming gas 204 can be fed to the arc lamp 120. The high purity water or gas free water 202 is used for the water wall and the cooling of the electrodes. Leaving the lamp is a gas/water mixture 206. This gas/water mixture 206 is separated into the high purity water or gas free water 202 and dry forming gas 204 by separator 210 before it can be re-fed to the inlets of the arc lamp 120. To generate the required pressure-drop across the arc lamp 120, the gas/water mixture 206 is pumped by means of a water driven jet pump 220.

A high-power electric pump 230 supplies the water pressure to drive the water wall in the arc lamp 120, the cooling water for the lamp electrodes, and the motive flow for the water driven jet pump 220. The separator 210 downstream to the water driven jet pump 220 can be used in extracting the liquid and the gaseous phase from the mixture. Before the forming gas 204 re-enters the arc lamp 120, the forming gas 204 is further dried in a coalescing filter 240, and a flow rate of the forming gas 204 is controlled by a control valve and/or mass flow controller 212A.

The water is passed through one or more particle filters 260 to remove particles sputtered into the water by the arc. Ionic contaminations are removed by ion exchange resins. A portion of water is run through mixed bed ion exchange filters 270. The inlet valve 272 to the mixed bed ion exchange filters 270 can be controlled by the water resistivity. If the water resistivity drops below a lower value, the inlet valve 272 is opened. When it reaches an upper value, the inlet valve 272 is closed. The system can contain an activated carbon filter bypass loop 280 where a portion of the water can be additionally filtered to remove organic contaminations. To maintain the water temperature, the water can pass through a heat exchanger 290.

The closed loop system 200 can further include a gas supply 250. The gas supply 250 includes a feed gas line to deliver the forming gas 204 to the arc lamp 120. The forming gas 204 can be pre-mixed in a forming gas source 255. The premixed forming gas can be controlled using one or more control valves and/or mass flow controllers 212B to deliver a desired amount of the forming gas 204 into the arc lamp 120. In some embodiments, the closed loop system 200 can be included in the arc lamp 120. In some embodiments, the gas supply 250 is separate from the closed loop system 200.

While the present subject matter has been described in detail with respect to specific example embodiments thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A thermal processing system, comprising:

a processing chamber configured to thermally treat a workpiece; and an arc lamp heat source, the arc lamp heat source comprising:

a plurality of electrodes configured to generate a plasma in a forming gas, wherein the plurality of electrodes comprises a tip and a heat sink at least partially around the tip, the heat sink comprises an inner portion and an outer portion, wherein the inner portion and the outer portion comprise different materials; and the forming gas comprises a mixture of a hydrogen gas and an inert gas with the hydrogen gas in the mixture having a concentration less than 4% by volume, the hydrogen gas introduced into the arc lamp prior to generating the plasma.

2. The thermal processing system of claim 1, wherein the forming gas is premixed.

3. The thermal processing system of claim 2, wherein the arc lamp heat source further comprises:

a circulation system configured to circulate the forming gas in the arc lamp heat source; and a gas supply configured to provide the forming gas to the circulation system.

4. The thermal processing system of claim 1, wherein the arc lamp heat source is configured such that the forming gas enters the arc lamp heat source at a first electrode of the plurality of electrodes, and the forming gas is exhausted at a second electrode of the plurality of electrodes.

5. The thermal processing system of claim 1, wherein the arc lamp heat source is coupled to a water loop configured to circulating water through the arc lamp heat source during operation of the arc lamp heat source such that a water wall is formed in the arc lamp heat source.

6. The thermal processing system of claim 5, wherein during an arc discharge between the plurality of electrodes, the hydrogen gas of the forming gas reacts with free oxygen dissociated from the water wall to reduce oxidation of the plurality of electrodes.

7. The thermal processing system of claim 5, wherein the arc lamp heat source further comprises a quartz tube.

8. The thermal processing system of claim 5, wherein the water forming the water wall is injected perpendicular to a center axis of the arc lamp heat source such that a centrifugal action generates a water vortex to form the water wall.

9. The thermal processing system of claim 8, wherein the arc lamp heat source is configured such that the forming gas rotates in a same direction as the water wall relative to the center axis of the arc lamp heat source during operation of the arc lamp heat source.

10. The thermal processing system of claim 1, wherein the tip of at least one of the plurality of electrodes comprises hafnium alloy.

11. The thermal processing system of claim 10, wherein the hafnium alloy comprises hafnium, carbon, and nitrogen.

12. The thermal processing system of claim 1, wherein the tip of at least one of the plurality of electrodes comprises tantalum hafnium carbide.

13. The thermal processing system of claim 1, wherein the heat sink comprises silver.

14. The thermal processing system of claim 1, wherein the heat sink comprises diamond-copper sintering material.

15. The thermal processing system of claim 1, wherein the heat sink comprises an inner portion of diamond-copper sintering material and an outer portion of silver or copper.

16. The thermal processing system of claim 1, wherein the hydrogen gas is $H_2$.

17. The thermal processing system of claim 1, wherein the hydrogen gas is $D_2$.

18. The thermal processing system of claim 1, wherein the inert gas is one or more of argon gas, helium gas, neon gas, or xenon gas.

19. The thermal processing system of claim 1, wherein the concentration of the hydrogen gas in the mixture is less than about 3% by volume.

20. An arc lamp, comprising:

a tube;

one or more inlets configured to receive water to be circulated through the arc lamp during operation as a water wall, the water wall configured to cool the arc lamp; and a plurality of electrodes configured to generate a plasma in a forming gas introduced into the arc lamp via the one or more inlets, the forming gas introduced into the arc lamp prior to generating the plasma, wherein the plurality of electrodes comprise:

a tip where the tip of at least one of the plurality of electrodes comprises hafnium alloy or tantalum hafnium carbide; and a heat sink around the tip, the heat sink comprises an inner portion and an outer portion, wherein the inner portion and the outer portion comprise different materials; and the forming gas comprises one or more inert gases.

21. The arc lamp of claim 20, wherein the hafnium alloy comprises hafnium, carbon, and nitrogen.

22. The arc lamp of claim 20, wherein the heat sink comprises silver.

23. The arc lamp of claim 20, wherein the heat sink comprises diamond-copper sintering material.

24. The arc lamp of claim 20, wherein the inner portion of the heat sink comprises diamond-copper sintering material and the outer portion of the heat sink comprises of silver or copper.

* * * * *